(12) United States Patent
Yacenda

(10) Patent No.: US 9,744,455 B2
(45) Date of Patent: *Aug. 29, 2017

(54) LOCATION AND AGE VERIFICATION FOR MOBILE GAMING

(71) Applicant: ELOTTERY, INC., Stamford, CT (US)

(72) Inventor: Michael W. Yacenda, Stamford, CT (US)

(73) Assignee: ELOTTERY, INC., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/988,086

(22) Filed: Jan. 5, 2016

(65) Prior Publication Data
US 2016/0129348 A1  May 12, 2016

Related U.S. Application Data

(63) Continuation of application No. 14/470,118, filed on Aug. 27, 2014, now Pat. No. 9,230,399, which is a continuation of application No. 13/234,910, filed on Sep. 16, 2011, now Pat. No. 8,834,251.

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/48 | (2014.01) |
| A63F 3/06 | (2006.01) |

(Continued)

(52) U.S. Cl.
CPC ............ *A63F 13/48* (2014.09); *A63F 3/0605* (2013.01); *G07F 17/326* (2013.01); *G07F 17/3225* (2013.01); *G07F 17/3241* (2013.01); *H04W 4/021* (2013.01)

(58) Field of Classification Search
USPC ...................... 463/16, 17, 22, 25, 39, 40, 42
See application file for complete search history.

(56) References Cited

U.S. PATENT DOCUMENTS

| | | |
|---|---|---|
| 5,802,199 A | 9/1998 | Pare, Jr. et al. |
| 6,363,485 B1 | 3/2002 | Adams et al. |
| 6,709,333 B1 | 3/2004 | Bradford et al. |

(Continued)

FOREIGN PATENT DOCUMENTS

WO    WO 2007/008714    1/2007

OTHER PUBLICATIONS

International Search Report Dated Feb. 15, 2013.

*Primary Examiner* — Adetokunbo O Torimiro
(74) *Attorney, Agent, or Firm* — F. Chau & Associates, LLC

(57) ABSTRACT

A method for electronic gaming on a mobile device including a location determining module and a wireless data connection includes receiving coordinate data from the location determining module. Accuracy data is received from the location determining module. A region of confidence within which the mobile device is known to be within is determined based on the accuracy data received from the location determining module. An extent to which the region of confidence is within one or more pertinent jurisdictions is determined. Electronic gaming over the wireless data connection of the mobile device is permitted when it is determined that the region of confidence is entirely within the one or more pertinent jurisdictions.

32 Claims, 5 Drawing Sheets

(51) Int. Cl.
*H04W 4/02* (2009.01)
*G07F 17/32* (2006.01)

(56) References Cited

U.S. PATENT DOCUMENTS

| | | |
|---|---|---|
| 7,828,652 B2 | 11/2010 | Nguyen et al. |
| 8,499,164 B2 | 7/2013 | Ortiz et al. |
| 2001/0036853 A1 | 11/2001 | Thomas |
| 2002/0094869 A1 | 7/2002 | Harkham |
| 2004/0248589 A1 | 12/2004 | Gwon et al. |
| 2008/0167060 A1 | 7/2008 | Moshir et al. |
| 2008/0194311 A1 | 8/2008 | Cage et al. |
| 2009/0042633 A1 | 2/2009 | Yacenda |
| 2009/0088180 A1 | 4/2009 | LaMance et al. |
| 2009/0088240 A1 | 4/2009 | Saunders et al. |
| 2010/0109864 A1 | 5/2010 | Haartsen et al. |
| 2010/0120449 A1 | 5/2010 | Jakorinne et al. |
| 2011/0070834 A1 | 3/2011 | Griffin et al. |
| 2011/0102259 A1 | 5/2011 | Ledvina et al. |
| 2011/0252464 A1* | 10/2011 | Sanjeev ............... H04L 63/107 726/7 |
| 2011/0269529 A1 | 11/2011 | Baerlocher |
| 2013/0159008 A1* | 6/2013 | Mills .................. G06Q 50/22 705/2 |
| 2013/0217408 A1* | 8/2013 | DiFazio .............. H04W 64/003 455/456.1 |
| 2014/0364186 A1 | 12/2014 | Yacenda |

\* cited by examiner

LOCATION AND AGE VERIFICATION FOR MOBILE GAMING

CROSS-REFERENCE TO RELATED APPLICATION

The present application is a Continuation of co-pending U.S. patent application Ser. No. 14/470,118, filed on Aug. 27, 2014, which is a Continuation of U.S. patent application Ser. No. 13/234,910, filed Sep. 16, 2011, the entire contents of which are herein incorporated by reference in their entirety.

BACKGROUND OF THE INVENTION

1. Technical Field

The present disclosure relates to mobile gaming and, more specifically, to location and age verification for mobile gaming.

2. Discussion of Related Art

While there are many variations, the basic lottery is a game of chance in which a player selects or is selected a set of numbers. A drawing is then performed to determine a set of winning numbers. Those players who had selected the winning numbers may be awarded a sum of money. Today, lottery games are often state run or administered on behalf of a state, although casinos and other private entities may administer lottery games where local laws permit.

Traditionally, the player would receive a paper ticket at the time of entry into the lottery game. The ticket would contain the numbers that the player selected or were otherwise assigned to the player. Because entry into the lottery would require the physical presence of the player to purchase the ticket, the age of the player could be verified at the point of sale, for example, by a clerk responsible for dispensing the lottery ticket. By verifying age, restrictions associated with lottery play may be adhered to.

In addition to verification of age, it is often important that the sale of the lottery ticket be performed within a particular jurisdiction. For example, where a lottery is administered by or on behalf of a state, the sale of the lottery tickets might have to be limited to the territory of that state. Under the traditional approach for lottery game entry that is performed in-person, a state need only ensure that their authorized points of sale are physically located within the jurisdiction of the state. Verification of the physical location of the player at the moment of entry is not a practical concern.

Lotteries need not be confined to a single jurisdiction. Today, multi-jurisdiction lottery games such as POWERBALL and MEGA MILLIONS are available in which multiple jurisdictions within the United States participate in combined sweepstakes. In such games, the location where the player purchases the lottery ticket with in the set of combined jurisdictions may affect how revenue generated from the sale of the ticket is shared among the participating jurisdictions.

Currently, entry into lottery sweepstakes is not limited to in-person transactions in which paper tickets are purchased. Lottery play may be performed over electronic lines of communication such as the Internet. As mobile communications devices such as mobile phones and Internet-enabled tablets proliferate, the possibility exists to engage in lottery play from a mobile device.

SUMMARY

A method for lottery play on a mobile device including a GPS receiver and a wireless data connection includes receiving coordinate data from the GPS receiver. Accuracy data is received from the GPS receiver. A region of confidence within which the mobile device is known to be within is determined based on the accuracy data received from the GPS receiver. An extent to which the region of confidence is within a pertinent jurisdiction is determined. Lottery play over the wireless data connection of the mobile device is permitted when it is determined that the region of confidence is entirely within the pertinent jurisdiction.

A method for lottery play on a mobile device including a wireless data connection includes capturing an image of an identification document establishing a player's age and appearance. The player's age is determined based on the captured image of the identification document. An appearance signature is calculated based on the player's appearance established from the captured image of the identification card. The determined player's age and calculated appearance signature are stored to a player database. An image of a player is captured using a camera module of the mobile device. The stored appearance signature is retrieved from the player database. An extent to which the captured image of the player matches the appearance signature retrieved from the player database is determined. Lottery play over the wireless data connection of the mobile device is permitted when the determined extent to which the captured image of the player matches the appearance signature retrieved from the player database meets or exceeds a predetermined threshold and the determined player's age meets or exceeds a minimum age requirement.

A method for lottery play on a mobile device including a wireless data connection includes capturing biometric data of a player using a module of the mobile terminal. The biometric data is sent to an identification server over the wireless data connection. The biometric data is analyzed at the identification server to estimate an age of the player and to determine an error margin. A probable age range is calculated based on the estimated age of the player and the determined error margin, at the identification server. It is determined whether the calculated probable age range is entirely greater than or equal to a minimum age requirement for lottery play, at the identification server. Instructions are transmitted from the identification server to the mobile terminal to permit lottery play when it is determined that the calculated probable age range is entirely greater than or equal to a minimum age requirement for lottery play.

A method for lottery play on a mobile device including a wireless data connection includes capturing biometric data of a player using a module of the mobile terminal. The captured biometric data is sent to an identification server over the wireless data connection. The biometric data is analyzed at the identification server to verify the identity of the player. A date of birth of the player is retrieved from a player database. Instructions from the identification server are transmitted to the mobile terminal to permit lottery play when the identity of the player is verified and the date of birth of the player establishes that the player's age is greater than or equal a minimum age requirement for lottery play.

A mobile terminal for providing mobile lottery play includes a GPS receiver for receiving coordinate data and accuracy data. A CPU calculates a region of confidence within which the system is known to be within based on the coordinate data and the accuracy data received by the GPS receiver. The CPU determines an extent to which the region of confidence is within a pertinent jurisdiction based on the region of confidence and a maps database. A wireless modem provides a wireless data connection. One or more input/output devices permit lottery play over the wireless data connection when it is determined by the CPU that the region of confidence is entirely within the pertinent jurisdiction.

A mobile terminal for providing mobile lottery play includes a biometric input unit capturing a player's biometric information. A wireless modem provides a wireless data connection, transmits the player's biometric information to an identification server, and receives, from the identification server, confirmation of the player's identity as a person whose age meets or exceeds a minimum age requirement. One or more input/output devices permit lottery play over the wireless data connection when confirmation is received from the identification server that the player's identity is of a person whose age meets or exceeds a minimum age requirement.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
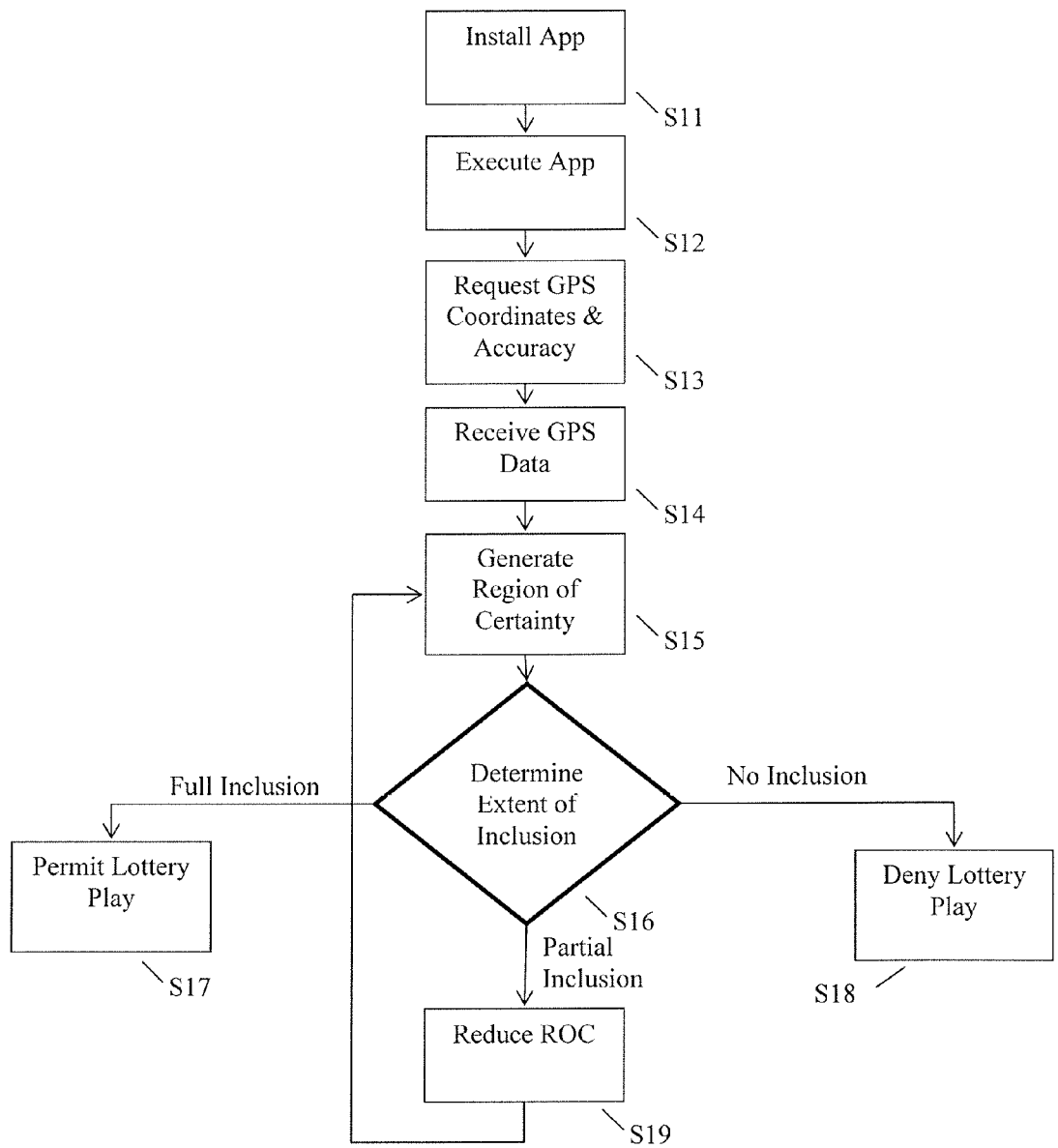
FIG. 1 is a flow chart illustrating an approach for mobile lottery play according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide systems and methods for conducting lottery play using a mobile device such as a mobile phone or portable computer as a player terminal for the entry into a lottery sweepstakes. Although no physical ticket need be generated, the entry into the lottery sweepstakes by the player may be colloquially referred to herein as the purchase of a lottery ticket. As the mobile device used by the player to purchase the lottery ticket may be operated in a variety of different locations, exemplary embodiments of the present invention seek to identify the location of the player at the moment of the ticket purchase consummation and/or some other relevant moment. This location may then be used either to permit or prevent the player from purchasing the lottery ticket and thereby participating in the lottery sweepstakes, or this location may be used to assign revenues or other interests between jurisdictions in a multi jurisdictional lottery game.

Exemplary embodiments of the present invention may also be used to verify the age of a player who engages in mobile lottery play. By verifying the age of the player, mobile lottery operators may ensure proper compliance with statutes and regulations that restrict the sale of lottery tickets to players over a predetermined age, which may be, for example, 21 years of age. This may be accomplished by either establishing that the player is in fact a pre-registered player whose age is already known or by taking steps to determine the age of the player by remote examination of documents/identification and/or by biometric analysis.

A mobile device may refer herein to a portable electronic communication device such as a mobile telephone, a feature phone, a smart phone, a personal digital assistant (PDA), a tablet computer, a laptop computer, or any other movable digital computer or digital appliance. The mobile device may include one or more means of communication such as a modem, for transmitting data over a cellular telephone network, personal communications system network, WiFi, mobile WiMAX, satellite communications network, etc. The mobile device may also include a satellite-based navigation system such as a GPS unit, a GLONASS unit, or a Galileo unit. The mobile device may also include a near field communication (NFC) unit and/or a Radio-frequency Identification (RFID) unit. The mobile device may also include other local area network capabilities such as BLUETOOTH.

The mobile device may also include various components that may be used reading documents and/or performing biometric analysis. Such components may include, for example, a still and/or video camera that may be used to capture a photograph of a document, ID card, a barcode, and/or an image of a player's face, retina, fingerprint, or any other biometric indicator. Such components may also include an RFID tag reader, a magnetic strip reader, and/or a near-field communication (NFC) tag reader for reading data encoded on an identification card or document. Such components may also include a fingerprint scanner and/or a microphone for receiving a sample of the player's voice so that voice recognition may be performed. Such components may also include a digitizer, which may be embodied as a touch-sensitive screen, upon which a user may provide a signature or other handwriting sample that may be used to authenticate the player's identity.

It is additionally conceivable that other biometric identification devices may be included in the mobile device, such as a device that can analyze DNA, as the cost of such devices falls to a point where incorporation into a mobile device is incorporation into a mobile device is practical.

Exemplary embodiments of the present invention may be executed as native software running on the mobile device, as software running on a server accessible by the mobile device, or a combination thereof. Where execution is in the form of native software running on the mobile device, the software may be embodied as an application installed on the mobile device. Where execution is in the form of software running on a server, the server may be accessed via a web browser running on the mobile device, or through a custom application installed on the mobile device. The software application may be installed on the mobile device by means known in the art such as direct installation or download from an application store or marketplace provided for the mobile device.

In either case, the software may provide for a user interface by which a player can establish a player account, verify the player's age and/or location, purchase a lottery ticket, manage lottery tickets already purchased, redeem lottery awards, and perform other transactions associated with lottery play. The software may also provide means of allowing a player to select lottery numbers or generate pseudorandom numbers for lottery play.

As indicated above, the software application may provide the ability to identify the age and/or location of the mobile device at the moment in which the purchase of the lottery ticket is consummated or at some other pertinent moment, such as at player account enrollment. The pertinent moment, for the purposes of verifying geographic location, may be predetermined and may be, for example, the moment the request for the purchase of a lottery ticket is initiated by a user, the moment the request for the purchase of a lottery ticket is completed, the moment a serial number is generated for the purchased lottery ticket, etc. Alternatively, location check may be performed at multiple pertinent moments throughout the lottery ticket purchasing process or may be performed continuously throughout the lottery ticket purchasing process.

Age verification need only be performed once, for example, when the player creates a player's account. Thereafter, age verification may be performed by verifying that the person engaged in lottery play is actually the same person that age has already been verified for. Alternatively, age may be verified at the time of play.

The software application may identify the location of the mobile device by analyzing output of various sensors and radios available to the mobile device. For example, the software application may receive data from a GPS module within the mobile device. This data may include, inter alia, position coordinates such as latitude and longitude as well as a measure of location accuracy and/or one or more regions of certainty. A region of certainty (ROC) is a range of coordinates within which the software application is reasonably certain to be within. The radius of the region of certainty may be dependent upon the confidence/accuracy with which the GPS unit is able to determine a position. For example, where the GPS unit is able to determine a location with a high degree of confidence/accuracy, the region of certainty may be relatively small, for example, as small as a few feet. However, where the GPS unit is only able to determine a location with a low degree of confidence/accuracy, for example, if a strong satellite lock cannot be established, the region of certainty may be relatively large, for example, on the order of hundreds of feet.

The region of certainty may also have an associated percentage value that represents the likelihood that the mobile device is within the region of certainty given its radius. This percentage may be predetermined based on the desired level of accuracy. For example, this percentage may be set to 90%, 95%, 99%, 99.9%, etc., as desired. This percentage may accordingly be inversely related to the length of the radius of the region of certainty. For example, the higher the percentage is set to, the larger the radius would be, given a fixed quality of GPS signal. Accordingly, an example of a determined set of coordinates may be (40.828202,-73.459945). However, the software application may additionally compute a region of certainty about this point such as a 99% certainty that the mobile device is within a radius of 0.005 of the coordinates (40.828202,-73.459945) and in this way, the region of certainty may be defined. However, the radius of the region of certainty need not be measured in latitude and longitude coordinates, as provided for the purposes of example, the radius may be defined in terms of linear measurement such as feet or meters.

Exemplary embodiments of the present invention may receive, for example, from a state or multi jurisdictional lottery commission, an acceptable percentage of certainty. For example, a state lottery commission may require 99.9% certainty that the player terminal be located within the appropriate jurisdiction when the lottery ticket is purchased. Accordingly, exemplary embodiments of the present invention may utilize information pertaining to the GPS unit's quality of signal lock to determine a radius about which the mobile device is 99.9% likely to be within.

The determined coordinates and the calculated radius may then be compared against a table or equation of jurisdictional boundaries to determine whether the entirety of the region of certainty is within the proper jurisdiction. If the entirety of the region of certainty is determined to be within the jurisdiction within which a lottery ticket may be sold, then the purchase of the lottery ticket though the mobile device may be allowed. Alternatively, if any portion of the region of certainty is determined to be beyond the proper jurisdiction, the transaction may be disallowed or canceled. In this event, alternative means of location verification may be employed to permit the transaction.

Alternative means of location verification may be employed, for example, where a portion of the region of certainty is determined to be within the proper jurisdiction while another portion of the region of certainty is determined to be beyond the proper jurisdiction, as this scenario may be indicative of lack of suitable insight into location. Alternative means of location may also be employed in place of the primary means of location identification described above.

Additionally, when lack of suitable insight into location is observed, the player may be instructed by the software application in ways to improve satellite accuracy which could then be used to shrink the region of certainty and allow the transaction to be completed. Such instructions may include, for example, informing the player to step outside of any structures and/or away from any tall objects which might obstruct satellite reception.

Alternative means of location may include, for example, a Near Field Communication (NFC) check-in. According to this approach, one or more NFC tags may be positioned at various known locations such as at convenience stores, gas stations and the like. A player may then be able to authenticate location within a particular jurisdiction by positioning the mobile device within close range of the NFC tag and thereby read location information from the NFC tag, which may be preprogrammed with location information for the location in which it is installed. The location information preprogrammed into the NFC tag may be encrypted to protect against tampering and to ensure reliability. Alternatively, the NFC tag may be preprogrammed with jurisdiction information identifying the jurisdiction within which the NFC tag is installed. This information may also be encrypted for security.

The NFC tag may also include other information such as vender identification data that may be used by the software application to appropriately credit the vender where the NFC tag is installed for the sale of the lottery ticket.

Other means of location identification may be used in addition to or in place of the methods described above. While these other means of location identification may be less accurate than, for example, GPS, use of one or more of these approaches may allow for a reduction of the radius of the region of certainty and in certain marginal cases, this reduction of the region of certainty may be the difference between being able to authenticate the player in the correct jurisdiction and allowing the ticket purchase to proceed and not being able to authenticate the player in the correct jurisdiction.

These other means of location identification may include, for example, geographic triangulation based on known positions and signal strengths of cellular telephone towers, FM radio broadcast towers, television broadcast towers, WiFi hotspots, etc. Known examples of this technique include assisted GPS (A-GPS), WiFi positioning systems, cell-site triangulation, and hybrid positioning systems.

FIG. 1 is a flow chart illustrating an approach for mobile lottery play according to an exemplary embodiment of the present invention. First a player may install an application for conducting mobile lottery play on a mobile device (Step S11). Installation of the application may be performed, for example, through an application store or market place established for the class of mobile device being used. Alternatively, the software application may be installed by downloading an executable file from a website, from an attachment to an email, or other known means for software installation. As an alternative to installing the application for conducting mobile lottery play on the mobile device, the player may access a website for mobile lottery play using a mobile web browser running on the mobile device.

After the application has been installed, the player may initiate execution of the application (Step S12). During execution of the application, the player may be guided through the steps of purchasing a lottery ticket. The application may then request GPS position information and accuracy data from a GPS unit of the mobile device (Step S13). The application may then receive both the position information and the confidence data from the GPS unit (S14). The position information may include, for example, latitude and longitude coordinates. The confidence data may include information that helps establish a degree of confidence in the accuracy of the received position information, for example, a number of satellite locks, signal strength for each satellite signal received, average satellite signal strength, an error count for each satellite signal received, etc.

The received position information and confidence data may then be used together to generate a region of certainty that the player terminal can be understood to be within with a predetermined percentage of certainty (Step S15). As described above, the percentage of certainty may be predetermined, for example, based on state lottery administration criteria and may be, for example, 95%, 99%, 99.9%, etc.

Next it may be determined to what extent the region of certainty is included within a pertinent jurisdiction (Step S16). Where the region of certainty is determined to be entirely within the pertinent jurisdiction (full inclusion) then the purchase of the lottery ticket by the player may be permitted (Step S17). Where the region of certainty is determined to be entirely beyond the pertinent jurisdiction (no inclusion) then the purchase of the lottery ticket by the player may be denied (Step S18).

However, where the region of certainty is not entirely within the pertinent jurisdiction and the region of certainty is not entirely beyond the pertinent jurisdiction (Partial Inclusion) then alternative location strategies may be employed to collect additional data with which to calculate the region of certainty so that the radius of the region of certainty may be reduced (Step S19). Several examples of these techniques are discussed above in detail; however, the invention should not be understood to be limited to the examples discussed above.

After the additional data is collected to reduce the region of certainty (Step S19), the region of certainty may be recalculated at Step S15 and the check of the extent of inclusion (Step S16) may be performed again.

Reduction of the region of certainty may also include the presentation of a set of instructions to the player for improving GPS satellite reception and thereafter, the application may re-request GPS position information (Step S13).

In either event, it is to be understood that only a limited number of attempts to define the mobile device as either entirely within or entirely beyond the pertinent jurisdiction might be performed and thereafter, the ticket purchase may be denied or postponed.

The above-described approach pertains to locating the mobile device within a particular jurisdiction for the purposes of allowing or disallowing the purchase of a lottery ticket however, exemplary embodiments of the present invention may also locate the mobile device within a particular jurisdiction for the purposes of determining which jurisdiction is to receive royalties associated with a mobile sale of a multi jurisdictional lottery ticket. In such a case, where the region of certainty is entirely within a first participating jurisdiction, credit for the lottery ticket transaction may be assigned to the first participating jurisdiction. Where the region of certainty is entirely within a second participating jurisdiction, credit for the lottery ticket transaction may be assigned to the second participating jurisdiction. Where the region of certainty is entirely beyond any participating jurisdiction, the sale of the lottery ticket may be denied as described above or one or more of the approaches discussed above may be employed to narrow the region of certainty to be fully within a particular jurisdiction.

However, where the region of certainty spans a first participating jurisdiction and a second participating jurisdiction, for example, even after all attempts have been made to narrow the radius of the region of certainty, the lottery ticket transaction may be allowed and credit for the lottery ticket transaction may be split between the first and second participating jurisdiction, for example, in accordance with the degree to which the region of certainty spans each participating jurisdiction or more simply on a half-and-half split. Thus, according to the first approach, if the region of certainty is 80% within the first participating jurisdiction and 20% within the second participating jurisdiction, the first participating jurisdiction may be assigned 80% of the credit for the sale of the lottery ticket and the second participating jurisdiction may be assigned 20% of the credit for the sale of the lottery ticket. According to the second approach, if the region of certainty is 80% within the first participating jurisdiction and 20% within the second participating jurisdiction, each participating jurisdiction may be assigned 50% of the credit for the sale of the lottery ticket.

According to a third all-or-nothing approach, credit for the sale of the lottery ticket may be fully attributed to the participating jurisdiction within which the majority (or plurality where the region of certainty extends into three or more jurisdictions) of the region of certainty is within.

Alternatively, the player may be asked what jurisdiction he is located within or credit may be assigned according to player's residence rather than player's location. It should be noted, however, that such a case may still require that the entire region of certainty be within one or more participating jurisdictions to ensure that the player is indeed within a participating jurisdiction, even if the particular participating jurisdiction cannot be sufficiently resolved.

It may also be that at least part of the region of certainty falls within a region of exceptional jurisdiction. A region of exceptional jurisdiction may be a region in which jurisdiction is not well defined or otherwise complex in nature.

Examples of exceptional jurisdiction may include international or interstate waters, American Indian reservations, diplomatic missions, etc. When at least part of the region of certainty falls within a region of exceptional jurisdiction, a rules database may be consulted to determine whether lottery play may be allowed.

As discussed above, the moment in which player location is determined may have a bearing on whether a player is permitted to purchase a lottery ticket over the mobile device. As described above, this pertinent moment in which location is checked may be at the start of the ticket purchase transaction, the conclusion of the ticket purchase transaction, at multiple points or continuously therebetween. However, the pertinent moment may be set, for example, immediately prior to the issuance of a lottery ticket serial number.

Figure 2:
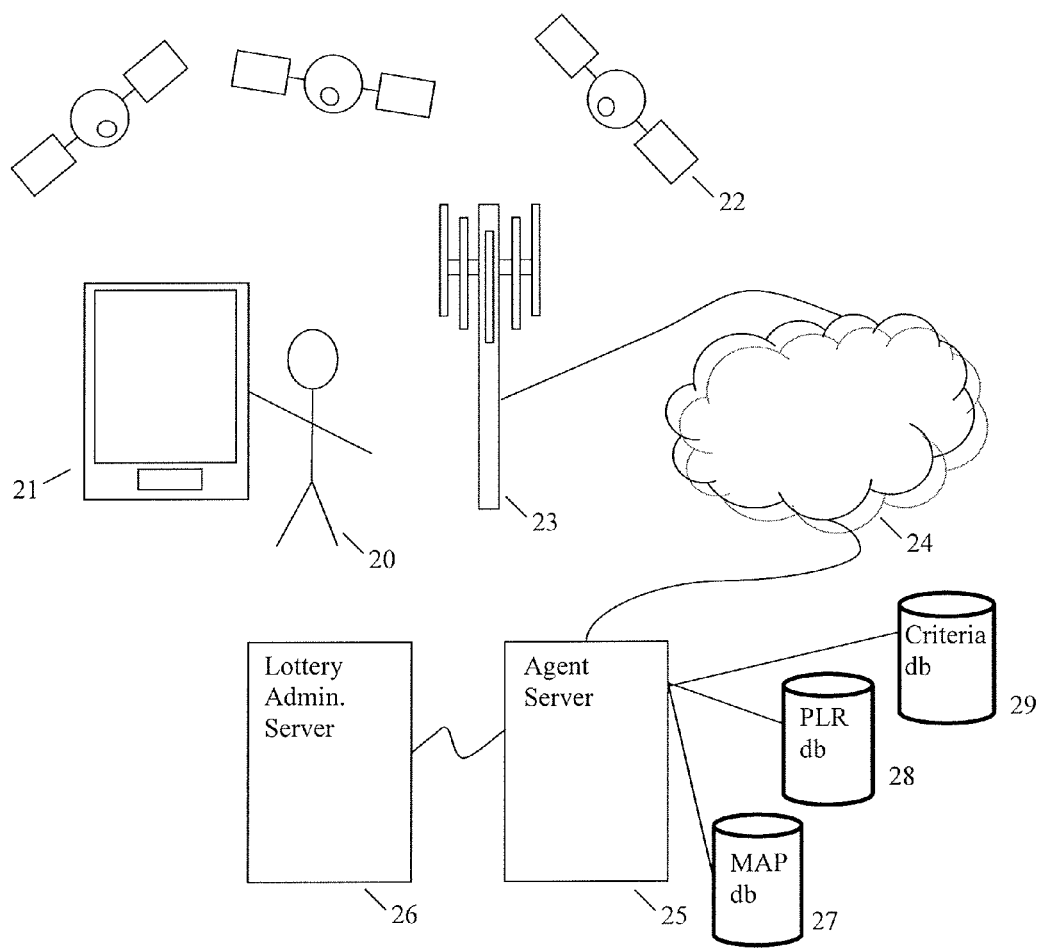
FIG. 2 is a diagram illustrating a system for the sale of mobile lottery tickets according to an exemplary embodiment of the present invention.

FIG. 2 is a diagram illustrating a system for the sale of mobile lottery tickets according to an exemplary embodiment of the present invention. A player 20 may be in personal possession of a mobile terminal 21. The mobile terminal may communicate with a wireless network via one or more base stations 23. The wireless network may provide the mobile terminal 21 with access to the Internet 24 or another computer network. The wireless terminal 21 may communicate with an agent server 25 via the Internet 24. The wireless terminal 21 may be able to determine its location coordinates along with a measure of accuracy by communication received from a constellation of satellites 22. The mobile terminal 21 may transmit its location coordinates to the agent server 25. The mobile terminal 21 may also transmit the measure of accuracy to the agent server 25 where a region of certainty may be computed. Alternatively, the mobile terminal 21 may use the measure of accuracy to compute for itself the region of certainty and the mobile terminal 21 may then send the computed region of certainty to the agent server 25. The agent server 25 may consult a criteria database 29 to determine criteria by which a lottery ticket may be sold. The criteria may include, for example, a jurisdiction in which a lottery ticket may be sold. The agent server may then consult with a map database 27 in which one or more jurisdictions are associated with location coordinates. The agent server 25 may then determine an extent to which the received or computed region of certainty is within the jurisdiction supplied by the criteria database 29 using information retrieved from the map database 27. The agent server 25 may also retrieve player information from a player database 28 and based on the retrieved and computed information, may make a determination as to whether a lottery ticket may be sold. If the agent server 25 determines that a lottery ticket may be sold, the agent server 25 may either issue a lottery ticket for the player or request that a lottery ticket be issued by a lottery administration server 26. The lottery administration server 26 may provide a serial number for an issued lottery ticket back to the agent server 25 and the agent server 25 may store the serial number for the issued ticket in the player database 28 and/or provide the serial number back to the mobile terminal 21 for storage. An issued lottery ticket may include not only the provided serial number, but may also include a set of play numbers. The play numbers may be selected by the user 20 on the mobile terminal 21 or may be randomly generated either by the player terminal 21, the agent server 25, the lottery administration server 26, or by another entity. A set of winning numbers may then be selected either by the agent server 25, the lottery administration server 26 or by an independently managed number selection server (not shown). The winning numbers may then be matched to the play numbers of the issued lottery ticket, by the lottery administration server 26, the agent server 25 and/or the mobile terminal 21. A prize may then be credited to the player 20 in accordance with a correspondence between the winning numbers and the play numbers and terms of play for the issued lottery ticket. The terms of play may be accessible to the player 20 via the player terminal 21 and may be made available to the player 20 at the time of the lottery ticket purchase.

Figure 3:
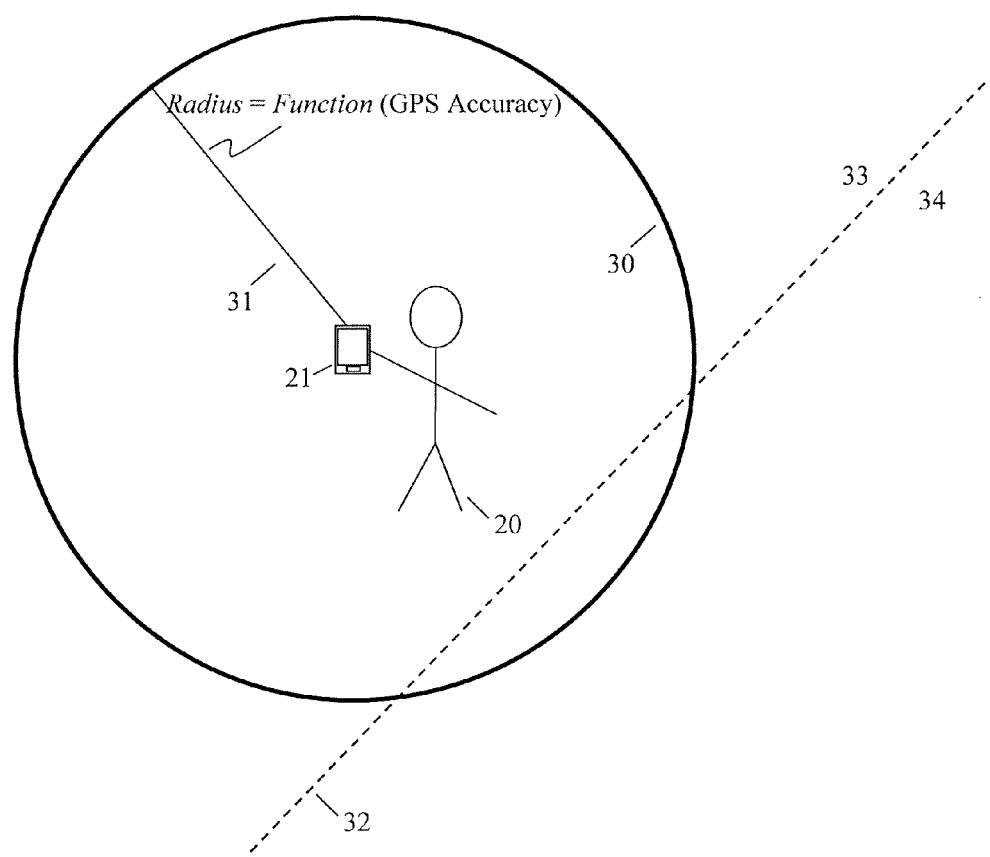
FIG. 3 is a diagram illustrating location verification according to an exemplary embodiment of the present invention.

FIG. 3 is a diagram illustrating location verification according to an exemplary embodiment of the present invention. As described above, the player 20 may be in personal possession of the mobile terminal 21. The mobile terminal may determine location coordinates and a measure of accuracy from a constellation of satellites 22. The mobile terminal 21 may use the location coordinates and the measure of accuracy to calculate a region of certainty 30 about the location of the player 20/mobile terminal 21. The calculated region of certainty 30 may be defined as an area within which the player 20/mobile terminal 21 is located. The region of certainty 30 may be centered about the player 20/mobile terminal 21, may be circular in shape, and may have a radius 31. The radius may be a function of the measure of accuracy; wherein, the greater the measure of accuracy, the smaller the radius 31 of the region of certainty is. It may then be determined, by the mobile terminal 21 and/or the agent server 25, an extent to which the region of certainty 30 is within a particular jurisdiction 33 that may be divided from an extra-jurisdictional region 34 by a boundary 32 which may be defined in a map database 27 that may be located at the location of the agent server 25, within the mobile terminal 21, or at some other location.

As described above, location might not be the only criterion used to determine whether a sale of a lottery ticket is allowed. Player age may also be a criterion. Exemplary embodiments of the present invention provide for a system and method for identifying the age of a player and/or verifying the identity of a player whose age is already known.

Figure 4:
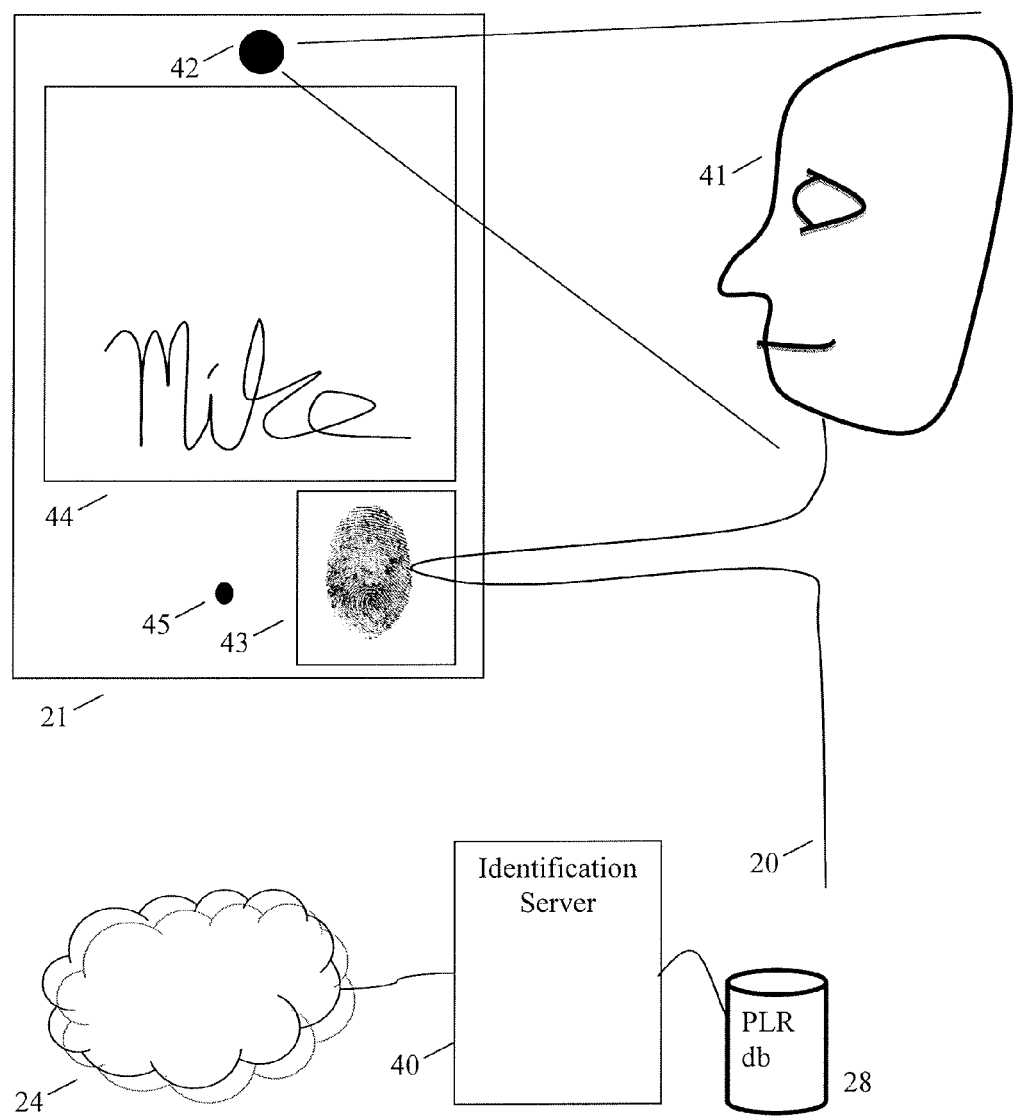
FIG. 4 is a diagram illustrating a system for verifying player age according to an exemplary embodiment of the present invention.

FIG. 4 is a diagram illustrating a system for verifying player age according to an exemplary embodiment of the present invention. As described above, there are two ways in which the player's age may be verified. According to the first approach, the player's age may be pre-verified, for example, at the time of player account generation, and the player's identity may be confirmed at the time of ticket sale. According to the second approach, the player's age may be directly verified, either for the purpose of establishing a new player account or for the purpose of purchasing a lottery ticket without a pre-verified age.

Where age is pre-verified, the player's identity may be verified, for example, by facial recognition. Facial recognition may be performed by acquiring an image of the player's face 41 using a camera module 42 incorporated into the mobile terminal 21. The actual software for performing facial recognition may be local to the mobile terminal 21 or the image of the player's face 41, after being acquired by the mobile terminal 21, may be transmitted via the Internet connection of the mobile terminal 21 to an identification server 40 which may perform facial recognition to verify the identity of the player 20. The player's identify verification may be performed by matching the image of the player's face to one or more pre-stored images of the player's face and/or data pertaining to appearance characteristics. The pre-stored images may be stored in a player database 28.

Alternatively, or additionally, the player's identity may be verified by fingerprint recognition. Fingerprint recognition may be performed by acquiring an impression of a finger of the player using a digital fingerprint scanner 43 incorporated into the mobile terminal 21. The actual software for performing fingerprint recognition may be local to the mobile terminal 21 or the impression of the player's finger may be transmitted via the Internet connection of the mobile terminal 21 to an identification server 40 which may perform fingerprint recognition to verify the identity of the player 20. The player's identity verification may be performed by matching the impression of the player's fingerprint to one or more pre-stored impressions of the player's fingerprint and/or data pertaining to fingerprint characteristics. The pre-stored fingerprint impressions may be stored in the player database 28.

Alternatively, or additionally, the player's identity may be verified by handwriting recognition and/or signature matching. A digitizer 44 may be incorporated into the mobile terminal 21. For example, the digitizer 44 may be a touch screen. The player 20 may then provide a handwriting sample and/or signature by writing on the digitizer with a stylus, capped pen, or some other implement. The actual software for performing handwriting recognition and/or signature matching may be local to the mobile terminal 21 or the digitized sample may be transmitted via the Internet connection of the mobile terminal 21 to an identification server 40 which may perform the handwriting recognition and/or signature matching. The player's identity verification may be performed by matching the handwriting sample and/or signature to one or more pre-stored samples of the player's handwriting/signature and/or data pertaining to handwriting/signature characteristics. The pre-stored samples may be stored in the player database 28.

Alternatively, or additionally, the player's identity may be verified by voice recognition. A microphone 45 may be incorporated into the mobile terminal 21. For example, the microphone 45 may be the microphone of a smartphone. The player 20 may then provide a voice sample by speaking into the microphone, for example, by reading text displayed on the mobile terminal provided for this purpose. The actual software for performing voice may be local to the mobile terminal 21 or the digitized sample of the voice, or a signature thereof, may be transmitted via the Internet connection of the mobile terminal 21 to an identification server 40 which may perform the voice recognition. The player's identity verification may be performed by matching the voice sample, or a signature thereof, to one or more pre-stored samples of the player's voice or signatures thereof. The pre-stored samples or vocal signature may be stored in the player database 28.

The player terminal 21 may also be used to create a player account and to provide the identifying information discussed above for storage in the player database 28. Verification of the player's age, in establishing a player account, may be performed by using the camera module 42 of the player terminal 21 to capture an image of the player's identification card. The verification of the authenticity of the player's identification card and/or the deciphering of the information written thereon may be performed either automatically using software local to the mobile terminal 21 or remotely on an identification server 40 using image matching and optical character recognition (OCR) or by sending the image of the player's identification card to a human operator for manual verification. Where manual verification is used, the operator may activate the player's account upon verification of the authenticity of the identification card and determining that the player is of a suitable age.

According to another exemplary embodiment of the present invention, the age of the player 20 may be determined by analyzing an image of the player's face 41 acquired by the camera module 42 of the mobile terminal using facial age estimation software. Facial age estimation may either be performed locally within the mobile terminal 21 or at the identification server 40 side by sending an image of the player's face over the mobile terminal's Internet connection to the identification server 40. Facial age estimation may be performed automatically using algorithms for identifying and dating facial features or by sending an image of the player's face to a human operator for manual verification. Facial age estimation may be used either as a single means of age verification or may be used in combination with other techniques such as those described above. For example, automatic facial age estimation may be used in conjunction with optical character recognition performed on an image of the player's identification card or document.

Facial age verification may provide either a single estimated age or a likely range of ages. The estimated age or age range may then be compared to the age criterion. The player may be permitted to purchase the lottery ticket when either the estimated age exceeds a predetermined threshold or the estimated range exceeds a predetermined threshold. The predetermined threshold may allow for a margin of error, for example, so that only those players whose age estimation exceeds 40-years may be permitted to purchase the lottery ticket in the absence of manual age verification.

According to another exemplary embodiment of the present invention, the player may be permitted to purchase a lottery ticket prior to age verification but age verification may be required to redeem a prize. In such a case, an image of the player may be captured at the time the ticket was purchased to verify that the player whose age is being verified at the time of redemption is indeed the player who purchased the lottery ticket.

Figure 5:
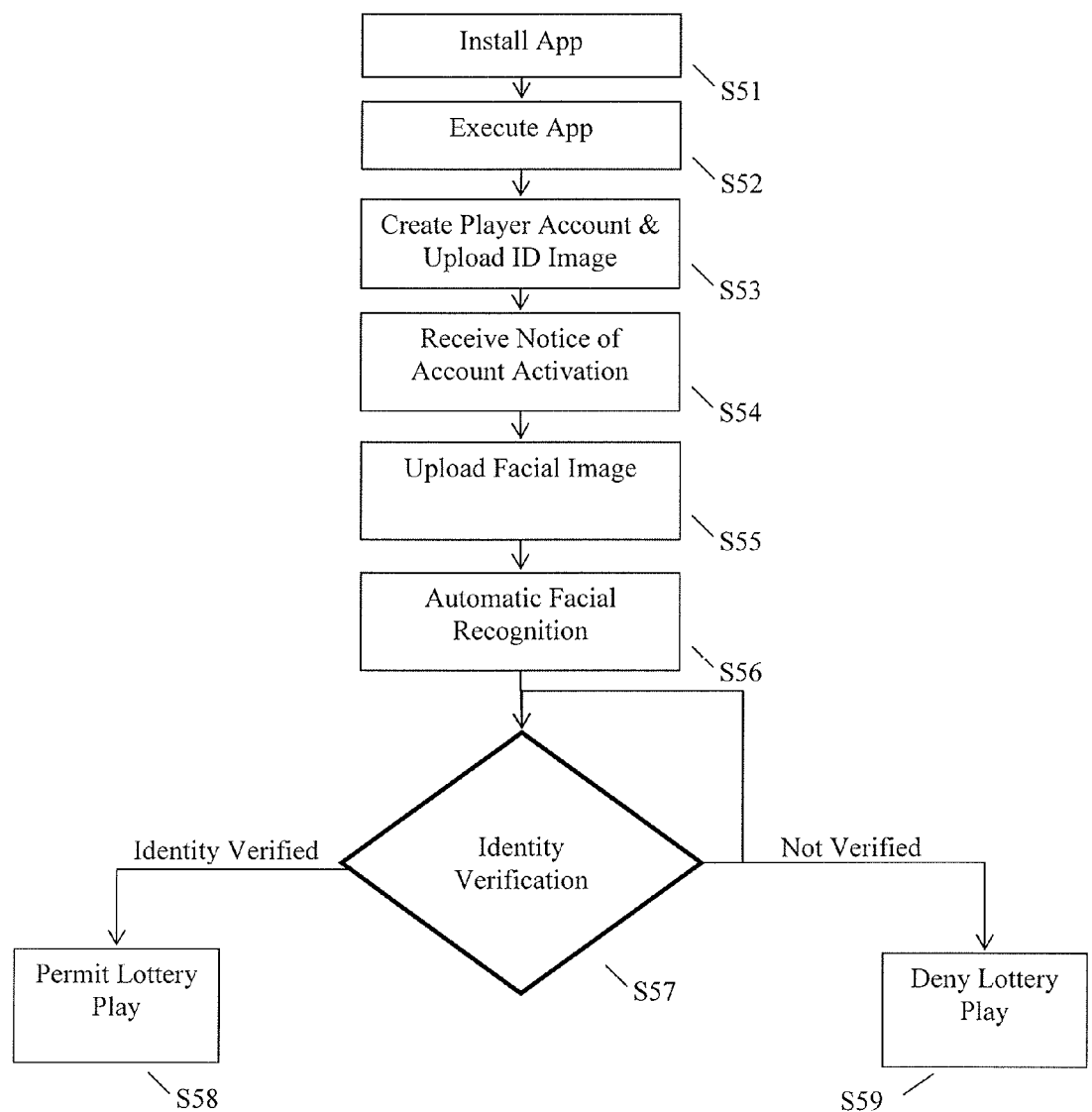
FIG. 5 is a flowchart illustrating a method for age verification according to an exemplary embodiment of the present invention.

FIG. 5 is a flowchart illustrating a method for age verification according to an exemplary embodiment of the present invention. It should be understood that the following method for age verification may be combined with the above-described method for location verification so that both location and age may be verified prior to the sale of a lottery ticket. Moreover, while FIG. 5 shows an example in which age verification is determined at the creation of a player account and identity verification is used at the point of ticket sale, as an alternative to this approach, age verification may be performed automatically at the time of ticket sale, for example, as described in detail above.

First an application may be installed on the mobile terminal (Step S51). The application may be a mobile application for mobile lottery play and may include functionality for signing up for a new player account. The installed application may be executed by the player (Step S52). If the player already has a player account then the method may skip ahead to step S55. If the player does not already have a player account then the player may create a player account using the mobile application (Step S53). As part of the creation of the player account, the player may be requested to furnish an identifying card or document. For example, the player may be asked to hold a valid government-issued driver's license in front of a camera incorporated into the mobile device so that an image of the document may be captured. Where automatic age verification is to be performed, the image of the identifying document may be processed either locally or at a remote server to determine whether the document establishes a sufficient age for lottery play. Alternatively, the ID image may be uploaded by the mobile application to an identification server for review.

Once at the identification server, the player's new account may either be manually or automatically reviewed to establish that the player is of a suitable age for lottery play. If the player's age is so established, the player's account may be activated and the mobile terminal and/or the player may receive a notice of account activation (Step S54). The player may then either proceed to lottery play or may continue with identity verification.

Identity verification may be performed, for example, where some time has passed between age verification and the player's desire to engage in lottery play. In performing identity verification, the player may first use the mobile application to capture an image of the player's face. The image may then be uploaded to an identification server (Step S55) for the remote performance of automatic facial recognition (Step S56) or the mobile application itself may perform automatic facial recognition (Step S56), depending on the computational capabilities of the mobile terminal. Automatic facial recognition may be used to ensure a match between the player and the player's previously uploaded ID image. Alternatively, or additionally, automatic facial recognition may include automatic facial age estimation.

If the player's identity is positively verified (Yes, Step S57), then lottery play may be permitted. If the player's identity is not positively verified (No, Step S57), then lottery play may be denied (Step S59) or identity verification may be repeated.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for authentication on a mobile device including a location determining module and a wireless data connection, comprising:
receiving coordinate data from the location determining module;
receiving accuracy data;
determining a region of confidence within which the mobile device is known to be within based on the accuracy data, the region of confidence being a substantially circular region centered about a coordinate location of the received coordinate data and having a radius that is proportional to the received accuracy data;
determining an extent to which the region of confidence is within one or more pertinent jurisdictions; and
authenticating the mobile device when it is determined that the region of confidence is entirely within the one or more pertinent jurisdictions.

2. The method of claim 1, wherein the accuracy data includes a number of satellite locks, satellite signal reception strength, or an error count for satellite signal.

3. The method of claim 1, wherein the region of confidence is an area within which it is 90% certain that the mobile device is within given the coordinate data and the accuracy data.

4. The method of claim 1, wherein the region of confidence is an area within which it is 95% certain that the mobile device is within given the coordinate data and the accuracy data.

5. The method of claim 1, wherein the region of confidence is an area within which it is 99% certain that the mobile device is within given the coordinate data and the accuracy data.

6. The method of claim 1, wherein determining an extent to which the region of confidence is within the one or more pertinent jurisdictions includes comparing the region of confidence to map data relating various geographic coordinates to various jurisdictions.

7. The method of claim 1, additionally comprising preventing execution of an application on the mobile device when it is determined that the region of confidence is at least partially beyond the one or more pertinent jurisdictions.

8. The method of claim 1, additionally comprising preventing execution of an application on the mobile device when it is determined that the region of confidence is fully beyond the one or more pertinent jurisdictions.

9. The method of claim 1, additionally comprising attempting to reduce the size of the region of confidence when it is determined that the region of confidence is partially within and partially beyond the one or more pertinent jurisdictions.

10. The method of claim 9, wherein attempting to reduce the size of the region of confidence includes using a near-field communications (NCF) reader of the mobile device to read a stationary NCF tag of a known location.

11. The method of claim 9, wherein attempting to reduce the size of the region of confidence includes using a Wi-Fi radio of the mobile device to detect a Wi-Fi network of a known location or using a Bluetooth radio of the mobile device to detect a stationary Bluetooth device of a known location.

12. The method of claim 9, additionally comprising authenticating the mobile device when the size of the region of confidence has been sufficiently reduced such that the region of confidence is entirely within the one or more pertinent jurisdictions.

13. The method of claim 9, wherein attempting to reduce the size of the region of confidence includes providing a user of the mobile device with a set of instructions for improving reception of the location determining module.

14. The method of claim 1, wherein the mobile device executes an application when the mobile device is authenticated.

15. The method of claim 1, wherein the mobile device provides access to an application executing on a remote server via a local application or a web browser running on the mobile device when the mobile device is authenticated.

16. The method of claim 1, wherein the authentication is for participation in a game in which a sum of money is an award.

17. A method for authentication on a mobile device including a wireless data connection, comprising:
capturing an image of an identification document establishing a user's age and appearance;
determining the user's age based on the captured image of the identification document;
calculating an appearance signature based on the user's appearance established from the captured image of the identification card;
storing the determined user's age and calculated appearance signature to a user database;
capturing an image of a user using a camera module of the mobile device;
retrieving the stored appearance signature from the user database;
determining an extent to which the captured image of the user matches the appearance signature retrieved from the user database; and
authenticating the user when the determined extent to which the captured image of the user matches the appearance signature retrieved from the user database meets or exceeds a predetermined threshold and the determined user's age meets or exceeds a minimum age requirement.

18. The method of claim 17, wherein:
the captured image of the identification document is sent by the mobile terminal over the wireless data connection to an identification server;
the identification server calculates the appearance signature and stores the appearance signature to the user database;
the captured image of the user is sent by the mobile terminal over the wireless data connection to the identification server;
the identification server retrieves the stored appearance signature, compares the appearance signature to the image of the user, and determines the extent to which the appearance signature and the image of the user match; and
the identification server sends a signal to the mobile terminal over the wireless data connection instructing the mobile terminal whether to authenticate the user.

19. A method for authentication on a mobile device including a wireless data connection, comprising:
capturing biometric data of a user using a module of the mobile terminal;
sending the biometric data to an identification server over the wireless data connection;
analyzing the biometric data at the identification server to estimate an age of the user and to determine an error margin;
calculating a probable age range based on the estimated age of the user and the determined error margin, at the identification server;
determining whether the calculated probable age range is entirely greater than or equal to a minimum age requirement for authentication, at the identification server; and
transmitting instructions from the identification server to the mobile terminal to authenticate the user when it is determined that the calculated probable age range is entirely greater than or equal to a minimum age requirement for authentication.

20. The method of claim 19, wherein the module of the mobile terminal is a camera module, the biometric data is an image of the face of the user, and analyzing the biometric data to estimate an age of the user includes performing facial age estimation.

21. The method of claim 19, wherein the authentication is for participation in a game in which a sum of money is an award.

22. A method for authentication on a mobile device including a wireless data connection, comprising:
capturing biometric data of a user using a module of the mobile terminal;
sending the captured biometric data to an identification server over the wireless data connection;
analyzing the biometric data at the identification server to verify the identity of the user;
retrieving a date of birth of the user from a user database; and
transmitting instructions from the identification server to the mobile terminal to authenticate the user when the identity of the user is verified and the date of birth of the user establishes that the user's age is greater than or equal a predetermined minimum age.

23. The method of claim 22, wherein the module of the mobile terminal is a camera, the biometric data of the user is an image of the user's face, and analyzing the biometric data to verify the identity of the user includes matching the image of the user's face to an image of the user's face stored within the user database or to an image signature stored within the user database.

24. The method of claim 22, wherein the module of the mobile terminal is a fingerprint scanner, the biometric data of the user is scan of the user's fingerprint, and analyzing the biometric data to verify the identity of the user includes matching the scan of the user's fingerprint to a scan of the user's fingerprint stored within the user database or to a fingerprint signature stored within the user database.

25. The method of claim 22, wherein the module of the mobile terminal is a touchscreen, the biometric data of the user is a digitization of a sample of the user's handwriting, and analyzing the biometric data to verify the identity of the user includes matching the digitization of the sample of the user's handwriting to a digitization of a sample of the user's handwriting stored within the user database or to a handwriting signature stored within the user database.

26. The method of claim 22, wherein the module of the mobile terminal is a microphone, the biometric data of the user is a digitization of a sample of the user's voice, and analyzing the biometric data to verify the identity of the user includes matching the digitization of the sample of the user's voice to a digitization of a sample of the user's voice stored within the user database or to a vocal signature stored within the user database.

27. The method of claim 22, wherein the authentication is for participation in a game in which a sum of money is an award.

28. A mobile terminal for authenticating game play, comprising:
a location determining module for receiving coordinate data and accuracy data;
a CPU for calculating a region of confidence within which the system is known to be within based on the coordinate data received by the location determining module, the CPU determining an extent to which the region of confidence is within one or more pertinent jurisdictions based on the region of confidence and a maps database;
a wireless modem providing a wireless data connection; and
one or more input/output devices for permitting game play over the wireless data connection when it is determined by the CPU that the region of confidence is entirely within the one or more pertinent jurisdictions,
wherein the region of confidence is a substantially circular region centered about the mobile terminal with a radius that is proportional to the accuracy data.

29. The mobile terminal of claim 28, wherein the game play includes a game in which a sum of money is an award.

30. A mobile terminal for providing game play, comprising:
a biometric input unit capturing a user's biometric information;
a wireless modem providing a wireless data connection, transmitting the user's biometric information to an identification server, and receiving, from the identification server, confirmation of the user's identity as a person whose age meets or exceeds a minimum age requirement; and
one or more input/output devices for permitting the game play over the wireless data connection when confirmation is received from the identification server that the user's identity is of a person whose age meets or exceeds a minimum age requirement.

31. The mobile terminal of claim 30, wherein the biometric input unit is a camera, microphone, fingerprint scanner, or touch sensitive digitize.

32. The method of claim 30, wherein the game play includes a game in which a sum of money is an award.

* * * * *